United States Patent
Rahim et al.

(10) Patent No.: US 8,656,326 B1
(45) Date of Patent: Feb. 18, 2014

(54) SEQUENTIAL CLOCK GATING USING NET ACTIVITY AND XOR TECHNIQUE ON SEMICONDUCTOR DESIGNS INCLUDING ALREADY GATED PIPELINE DESIGN

(71) Applicant: Atrenta, Inc., San Jose, CA (US)

(72) Inventors: Solaiman Rahim, San Jose, CA (US); Mohammad H. Movahed-Ezazi, Saratoga, CA (US)

(73) Assignee: Atrenta, Inc., San Jose, CA (US)

( * ) Notice: Subject to any disclaimer, the term of this patent is extended or adjusted under 35 U.S.C. 154(b) by 0 days.

(21) Appl. No.: 13/766,017

(22) Filed: Feb. 13, 2013

(51) Int. Cl.
*G06F 17/50* (2006.01)
*G06F 9/455* (2006.01)

(52) U.S. Cl.
USPC ............ 716/104; 716/105; 716/132; 716/133

(58) Field of Classification Search
USPC .................................. 716/104, 105, 132, 133
See application file for complete search history.

(56) References Cited

U.S. PATENT DOCUMENTS

| | | | |
|---|---|---|---|
| 6,318,911 B1 | 11/2001 | Kitahara | |
| 6,345,379 B1 * | 2/2002 | Khouja et al. ................ | 716/115 |
| 6,457,167 B1 | 9/2002 | Kitahara | |
| 7,076,748 B2 | 7/2006 | Kapoor et al. | |
| 7,484,187 B2 | 1/2009 | Eisner et al. | |
| 7,546,559 B2 | 6/2009 | Kapoor et al. | |
| 7,612,597 B2 | 11/2009 | Matsumoto | |
| 7,631,209 B2 | 12/2009 | Schultz | |
| 7,725,848 B2 * | 5/2010 | Nebel et al. .................. | 716/136 |
| 7,746,116 B1 | 6/2010 | Narayanan et al. | |
| 7,761,827 B1 | 7/2010 | Ramachandran et al. | |
| 7,772,906 B2 | 8/2010 | Naffziger | |
| 7,774,730 B2 | 8/2010 | Kanamaru | |
| 7,882,461 B2 | 2/2011 | Jiang et al. | |
| 7,884,649 B1 | 2/2011 | Savoj et al. | |
| 7,930,673 B2 | 4/2011 | Jiang et al. | |
| 7,937,634 B2 | 5/2011 | Almukhaizim et al. | |
| 7,941,679 B2 | 5/2011 | Allen | |
| 8,065,643 B2 | 11/2011 | Tamiya | |
| 8,069,026 B2 | 11/2011 | Higuchi | |
| 8,086,975 B2 | 12/2011 | Shiring et al. | |
| 8,132,144 B2 | 3/2012 | Sundaresan et al. | |
| 8,166,444 B2 | 4/2012 | Arbel et al. | |
| 8,207,756 B2 | 6/2012 | Shionoiri et al. | |
| 8,219,946 B1 | 7/2012 | Manovit et al. | |
| 8,225,245 B2 | 7/2012 | Oommen et al. | |
| 2005/0204316 A1 * | 9/2005 | Nebel et al. .................. | 716/2 |
| 2007/0220461 A1 | 9/2007 | Baumgartner et al. | |
| 2007/0250798 A1 | 10/2007 | Chaudhry et al. | |
| 2008/0209370 A1 | 8/2008 | Koelbl et al. | |
| 2008/0288901 A1 | 11/2008 | Barowski et al. | |
| 2008/0301604 A1 | 12/2008 | Itskovich et al. | |
| 2009/0044154 A1 | 2/2009 | Berger et al. | |
| 2009/0064070 A1 | 3/2009 | Kitahara et al. | |

(Continued)

*Primary Examiner* — Stacy Whitmore
*Assistant Examiner* — Magid Dimyan
(74) *Attorney, Agent, or Firm* — Thomas Schneck; Mark Protsik

(57) ABSTRACT

The circuit design process requires ways to reduce the power consumption of large integrated circuits and system-on-chip designs. This is typically done by introducing a process of clock gating thereby enabling or disabling flip-flops associated with specific functional blocks within the circuit. However, such changes in the circuit require synthesis and verification to ensure correctness of design and operation as sequential clock gating changes the state function dynamically. It is therefore necessary to define synthesis methods adapted to such dynamic changes in the design. According to an embodiment a sequential clock gating method uses an exclusive-OR technique to overcome the deficiencies of the prior art methods.

6 Claims, 7 Drawing Sheets

(56) References Cited

U.S. PATENT DOCUMENTS

| | | |
|---|---|---|
| 2009/0138837 A1 | 5/2009 | Baumgartner et al. |
| 2009/0195280 A1 | 8/2009 | Schlegel et al. |
| 2009/0224812 A1 | 9/2009 | Fujisawa |
| 2009/0327980 A1* | 12/2009 | Melamed-Kohen et al. ..... 716/2 |
| 2010/0042569 A1 | 2/2010 | Arbel et al. |
| 2010/0070941 A1 | 3/2010 | Sircar et al. |
| 2010/0083197 A1 | 4/2010 | Schultz |
| 2010/0198420 A1 | 8/2010 | Rettger et al. |
| 2010/0204844 A1 | 8/2010 | Rettger et al. |
| 2010/0231045 A1 | 9/2010 | Collins et al. |
| 2010/0231282 A1 | 9/2010 | Singasani |
| 2010/0253409 A1 | 10/2010 | Yeh |
| 2011/0084551 A1 | 4/2011 | Johnson et al. |
| 2011/0093431 A1 | 4/2011 | Arbel et al. |
| 2011/0156752 A1 | 6/2011 | Sofer et al. |
| 2011/0202788 A1 | 8/2011 | Hesse et al. |
| 2011/0248720 A1 | 10/2011 | Feldman et al. |
| 2012/0013627 A1 | 1/2012 | Shah et al. |
| 2012/0102344 A1 | 4/2012 | Kocev et al. |
| 2012/0173943 A1 | 7/2012 | Cesari |
| 2012/0210291 A1* | 8/2012 | Gu et al. ................. 716/136 |
| 2012/0242368 A1 | 9/2012 | Nozuyama |

* cited by examiner

SEQUENTIAL CLOCK GATING USING NET ACTIVITY AND XOR TECHNIQUE ON SEMICONDUCTOR DESIGNS INCLUDING ALREADY GATED PIPELINE DESIGN

TECHNICAL FIELD

The present invention relates to the field of circuit design, synthesis and verification. In particular it relates to very large integrated circuit design synthesis and verification, and even more particularly it relates to a system, method and computer program product for synthesis and verification of clock gating on system on chip integrated circuits.

BACKGROUND ART

Power usage of system on chip (SOC) integrated circuit (IC) is a major concern during its design. The increasing integration of functions into the SOC with higher and higher speeds of operation has created a need find methods for reducing power consumption. One such method is to selectively switch-off unused portions or functional blocks of the SOC during operation. Such power reduction in SOCs during operation is achieved by performing clock gating, where clock signals (clocks) provided to the Flip-Flops (flops) within the functional block is switched-off thereby disabling the section of the circuit that is not being used.

Typical clock gating can be split into two classes, combinational clock gating and sequential clock gating. Combinational clock gating is the process of computing an explicit enable for a flop and use this enable to gate the clock to the flop. This requires only a combinational analysis of the design, leading to synthesis of a gating circuit for the clock to the flop. Synthesis tools easily perform any required combinational clock gating functionality to reduce the power of an SOC during synthesis.

On the other hand sequential clock gating is the process of computing an implicit enable for a flop. Since this requires a sequential analysis of the design, synthesis tools are not usually equipped to generate and implement such sequential clock gating circuits effectively.

Several specialized techniques to perform sequential clock gating have been published. The most common published techniques are to derive the observability don't care (OCD) condition, that is, the condition for which a flop is not observable; and stability (STC) condition, that is, the condition for which the input value of the flop does not change. It is necessary to identify OCD and STC conditions and use these conditions as an implicit enable to gate the flop.

FIG. 1 is a typical circuit 100 using flip-flops (flops), 111 to 114. These flops are designated FF1 111, FF2 112, FF3 113 and FF4 114. Three of the flops 111 to 113 have respective enable signals EN1 101, EN2 102 and EN3 103. The outputs of the three enabled flops 111, 112 and 113 are multiplexed through a multiplexer 110 to feed FF4 114.

In the above case, existing methods derive an enable, which is a delay of (EN1||EN2||EN3). To find this enable, existing methods traverse the fan-in of FF4 114 until reaching the three flops, FF1 111, FF2 112 and FF3 113 and extract the STC condition of these flops; that is the states of enables EN1 101, EN2 102 and EN3 103. It then performs an OR of these enables EN1 101, EN2 102 and EN3 103 and delays them by a clock cycle to compute the final STC condition, that is, the enable of FF4 114.

The resultant circuit 200 diagram is shown in FIG. 2. The enables EN1 101, EN2 102 and EN3 103 of FIG. 2 are fed into a three input OR gate 201. The output of OR gate 201 is delayed by a single clock cycle using the added FF, FF5 202. The output of FF5 202 forms the enable EN4 203, that enables the clock of the flop FF4 114.

However the current methods to compute STC suffer from several limitations. They are not able to identify STC conditions for all cases, they also do not take into account the activity of the net, and finally none of the prior art methods can provide a solution to cover synthesis of clock gating in the case of an existing gated pipeline design. These limitations of the current STC computation are detailed below using the FIG. 3.

FIG. 3 is an exemplary pipeline design 300 where flops F4-1 310, F4-1 311, F4-3 312 and F4-4 313 for a pipeline logic that is enabled by the enable En4 301. The flop F4-1 310 has a synchronous reset connected as a primary input reset. The flop FF3 303 is shown as a flop without an enable associated with it and the flop FF1, 111 is enabled by the enable EN1 101 and the flop FF2 112 is enabled by the enable EN2 102 as shown in FIG. 3 pipeline design 300.

The power dissipation of this pipeline design is a factor of the enable EN4 301 which is used to enable the clock 350 of the pipeline stages. If this enable is set to active, or a value of <1>, for a long period of time, that is, active for a large number of clock cycles at a time, the efficiency of clock gating using EN4 301 is minimum and such clock gating will not decrease the active power of FF4-1 310. Since the clock gating has to be sequentially delayed for the pipeline stages FF4-1 310 to FF4-4 313 the probability of gating based on the pipeline flops is limited and the current methods of deriving STC are not sufficient to compute the STC of the pipeline stage. Further in order to compute the STC of flop FF4-1 310, the fan-in of the first flop FF4-1 310 of the pipeline has to be traversed. The fan-in traversal within the circuit will encounter a primary reset input 304, a flop FF3 303 which is a flop without a reset and two flops FF1 111 and FF2 112 with reset. Though the condition of the flops FF1 111 and FF2 112 have been covered in prior art, the other two conditions, namely having a primary input (PI) and having a flop without enable in the fan-in traversal path, are not covered by the prior art STC computation methods. Due to these limitations the STC of flop FF4-1 cannot be computed using the prior art methods.

It is hence necessary and useful to find a solution that can provide full clock gating synthesis and verification coverage for a gated design including gated pipeline designs.

SUMMARY DISCLOSURE

A computation, design synthesis method implemented on a computing system is provided. The method begins by identifying a first selected flip flop (flop) in the design for clock gating and then traversing a fan-in path of the flop to a termination in a component that is one of a primary input, a flop with enable and a flop without enable. Next, a stability condition (STC condition) of the first selected flip-flop (flop) in the design is computed for each of the terminations reached using the XOR based computation, and computed STC conditions are combined to generate a consolidated STC condition for the first flop. An implementation for the consolidated STC condition is generated such that the consolidated STC condition in semiconductor design generates the necessary clock gating signal for the identified first flop.

The STC condition for the fan-in path of the first selected flop ending in the component that is the primary input to the semiconductor design is generated by first delaying the primary input by a clock cycle to generate a delayed primary input and then doing a XOR function of the primary input with the delayed primary input. The STC condition for the fan-in path of the first selected flop ending in the components that are flops with enables is by first generating delayed enables, where each of the enables are delayed by a clock cycle and then generating an OR function of all the delayed enables. The STC condition for the fan-in path of the first selected flop ending in the component that is the flop without enable is by first generating a XOR function of the input of the flop with the output of the flop and then delaying the XOR output by a clock cycle. The STC condition for clock gating of the first selected flop may be generated by computing an OR function of the STC conditions of the individual terminating components of the fan-in paths of the first selected flop.

A circuit implementation is provided for generating a pipeline clock gating (pipeline gating) using a stability condition (STC condition) for a pipeline in a semiconductor design with an active enable. The implementation comprises computing a first STC condition of a first flip-flop (flop) of the pipeline in the semiconductor design with the enable in an enabled state; generating a second STC condition, called New_STC condition for the first flop of the pipeline in the semiconductor design by: generating an OR function of the first STC condition and an inversion of the New_STC condition; delaying the result produced by a clock cycle using a second flop; and computing the New-STC condition by generating an AND function of the delayed output of the second flop with the active enable.

DETAILED DESCRIPTION

The circuit design process requires ways to reduce the power consumption of large integrated circuits (ICs) and system on chip designs. This is typically done by introducing a process of clock gating thereby enabling or disabling flip-flops (flops) associated with specific functional blocks within the IC. However, such changes in the circuit require synthesis and verification to ensure correctness of design and operation as sequential clock gating changes the state function dynamically. It is therefore necessary to define synthesis methods adapted to such dynamic changes in the design. According to an embodiment a sequential clock gating method uses an exclusive OR (XOR) technique to overcome the deficiencies of the prior art methods.

Figure 1:
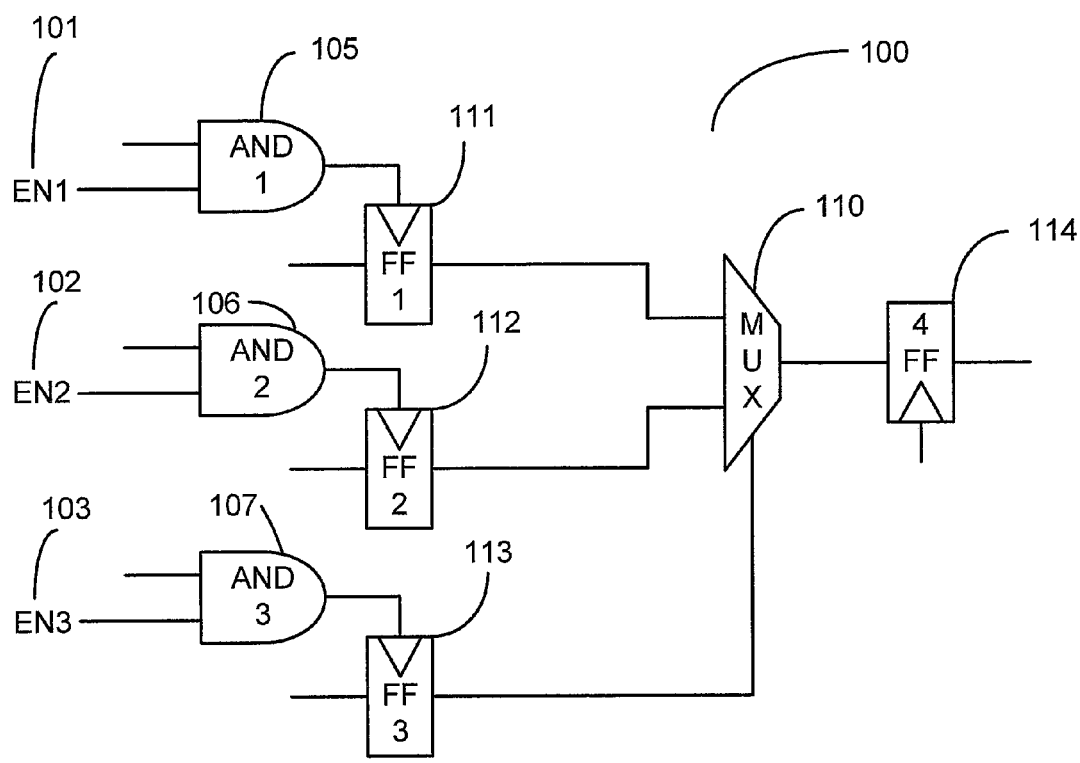
FIG. 1 is a gate level diagram of an original block level clocked design using flip-flops FF1 to FF4 (Prior art).
Figure 2:
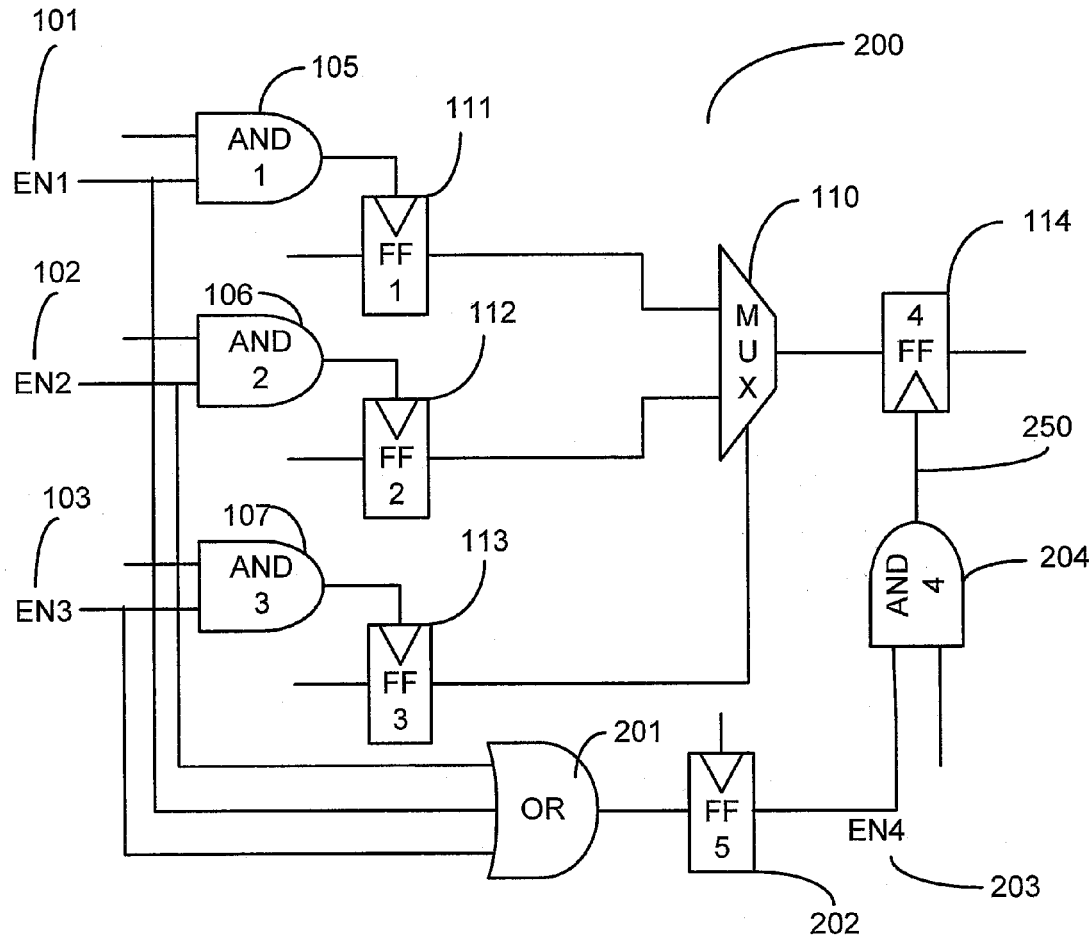
FIG. 2 is a modified gate level diagram of the circuit of FIG. 1 with added gate clocking for the flip-flop (Prior art).
Figure 3:
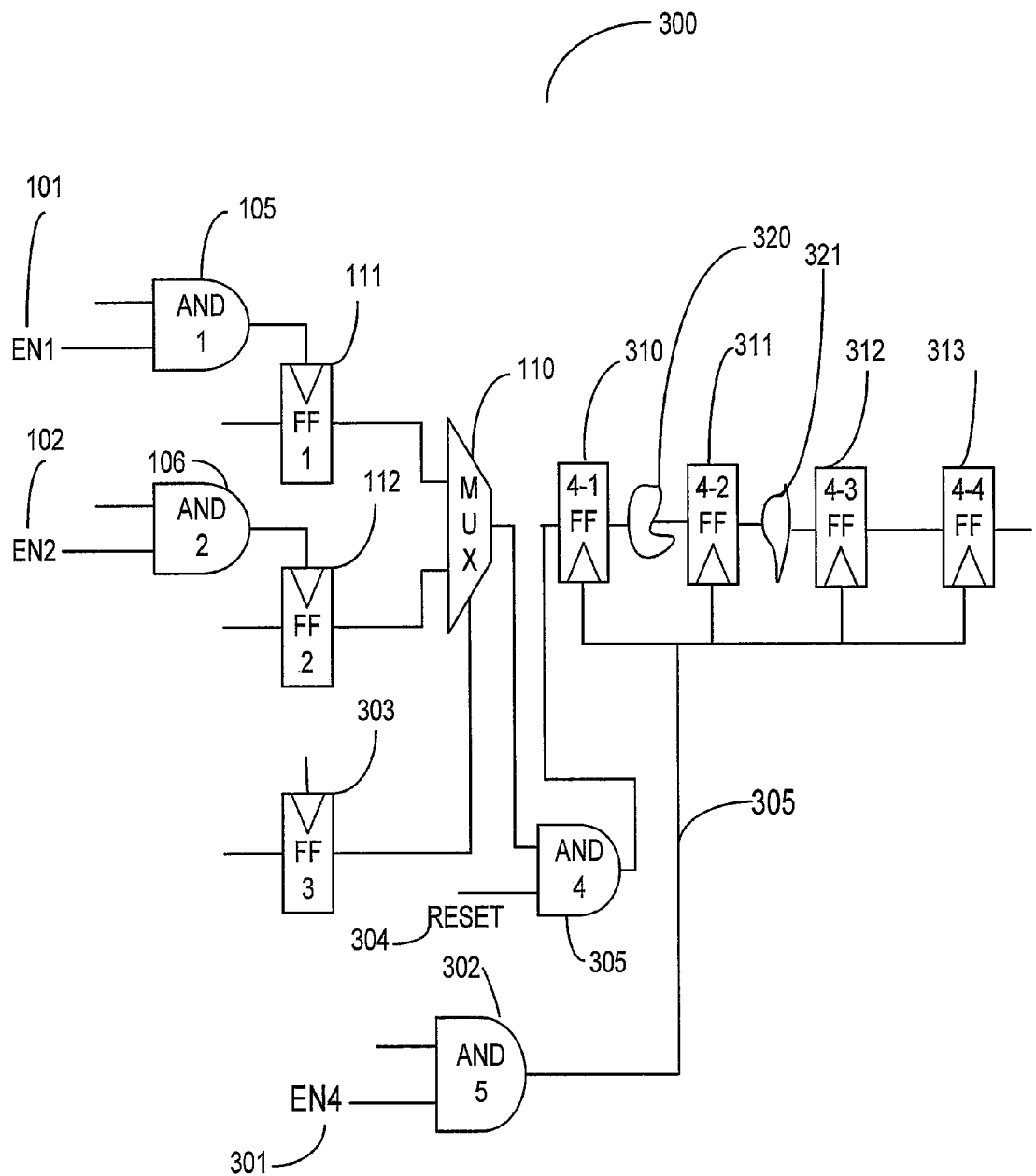
FIG. 3 is a pipeline logic design where the flops of the pipeline have a single enable.

FIG. 3 as explained above is an exemplary and non-limiting pipeline circuit 300 where flops F4-1 310, F4-1 311, F4-3 312 and F4-4 313 for a pipeline logic that is enabled by the enable En4 301. The flop F4-1 310 has a synchronous reset connected as a primary input reset. The flop FF3 303 is shown as a flop without an enable associated with it and the flop FF1 111 is enabled by the enable EN1 101 and the flop FF2 112 is enabled by the enable EN2 102 as shown in the fan-in traversal path of the flop FF4-1 310.

According to an embodiment a method described herein overcomes these limitations of the prior art by using a XOR technique. Exemplary and non-limiting FIG. 4 shows the modified pipeline circuit 400 of the basic pipeline design 300 of FIG. 3, modified to include the clock gating as per the disclosed an embodiment of the method using the XOR technique.

Figure 4:
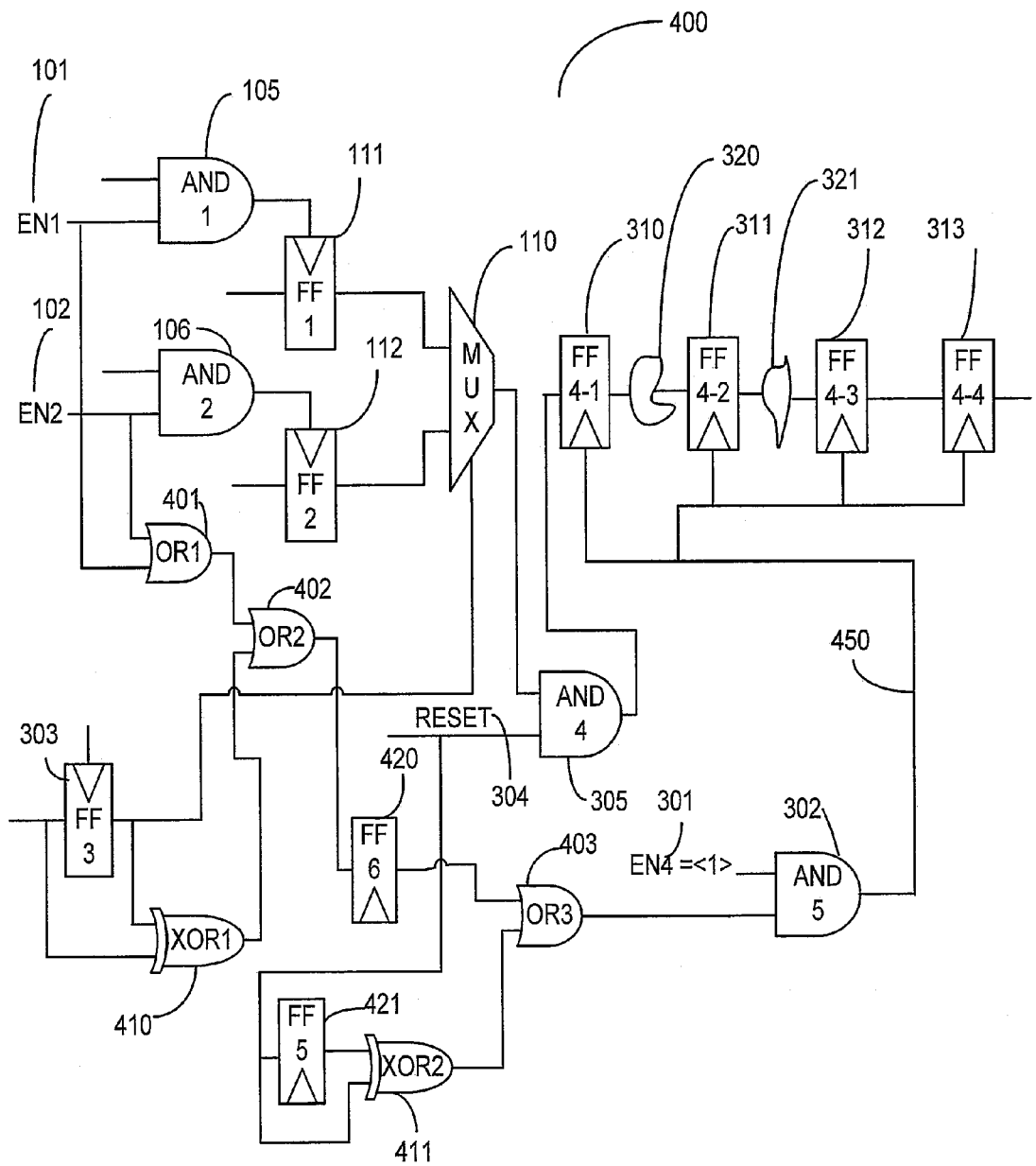
FIG. 4 is modified pipeline logic 400 of FIG. 3 with added gate clocking using STC condition including reset and flop with no enable in the design.

The STC of a PI is derived by delaying the PI by one cycle and generating the XOR of the delayed PI with the original PI. Hence STC (PI)=[{delay (PI)} XOR PI]. In Verilog STC (PI)=[{delay (PI)} XOR PI] can be written as:
 Reg delay;
 always (@posedge clk) delay_PI<=PI;
 wire stc_PI=delay_PI^PI;

The implementation of the STC of PI is shown in FIG. 4 using the flop FF5 421 and the XOR gate XOR2 411. The flop 421 is used to generate a delayed reset 304 and then providing the output of the flop 421 as one of the inputs to XOR gate XOR2 411. The second input to the XOR2 411 is the original reset 304 input. The output provides the STC condition of the reset (where the reset 304 input is a PI).

The STC of a flop without enable is computed by generating the XOR of the input of the flop with the output of the flop. The Verilog implementation of this STC condition is:
 wire stc_flopnoenable=(flopnoenable_d^flopnoenable_q);
or if the flop input is a bus of n+1 width indicated as [0:n] then
 bus stc_flopnoenable [0:n]=(flopnoenable_d[0:n]^flopnoenable_q[0:n]);

In FIG. 4 the STC of the flop with no enable is implemented by the Flop FF3 303 and the XOR gate, XOR1 410. The two inputs to the XOR1 410 are the input d and output q of the flop FF3 303 The output of the XOR1 410 provides the STC condition of the flop FF3 303 which has no enable.

Considering the pipeline design 300 of FIG. 3, the STC of the flop FF4-1 310 is generated using the XOR technique. The generated STC conditions include those relating to the PI and flop without reset. Combining the STC conditions of the terminations of the fan-in the STC of FF4-1 310 is written as:
 STC_FF4-1=delay (Enable 1 OR enable 2
 OR (FF3-d XOR FF3_q))
 OR (reset XOR delay_reset)
That design when written in Verilog is:
 STC_FF4-1=delay(EN1||EN2||(FF3_d^FF3-q))||(reset^delay_reset);

In the case of the pipeline design 300 of FIG. 3 if the enable EN4 301 is in the on state, that is the enable is inactive with an input of <1> as shown in FIG. 4, the STC_FF4-1 450 can be directly used as enable for the flop FF4-1. The first delay using the flop FF6 420 is to cater for the delay of the enables EN1 and EN2 to synchronize the sequential depth of FF4-1 with the enables of the two flops FF1 and FF2. The reset itself is in the same sequential depth as FF4-1.

If the enable EN4 301 is an active enable for the gated flops FF4-1 310 to FF4-4 313 of the pipeline then the STC_FF4-1 generated cannot be directly applied as gated clock 450 to FF4-1 301 as it will change the functionality of the circuit. This condition is shown in exemplary and non-limiting FIG. 5 which is modified to take care of the gated pipeline condition of the circuit. In order to maintain the functionality of the circuit the following modification has to be done.

The effect of the enable or gating is introduced into the STC_FF4-1 as follows to generate New_STC_FF4-1:
 Delay1<=INVERT (enable EN4 AND delay1)

OR STC_FF4-1;
New_STC_FF4-1=Delay1 AND enable EN4
This can be generated in Verilog as:
   Reg delay1;
   Always @ posedge clk;
   Delay1<=!(enableEN4 and Delay1)||STC_FF4-1;
   Wire New_STC_FF4-1=Delay1 && EnableEN4;
(Note: here the initial state of the delay1=<1>)
Signal Wire New_STC_FF4-1 is the now the enable for FF4-1 called New_enable_FF4-1 550.

Figure 5:
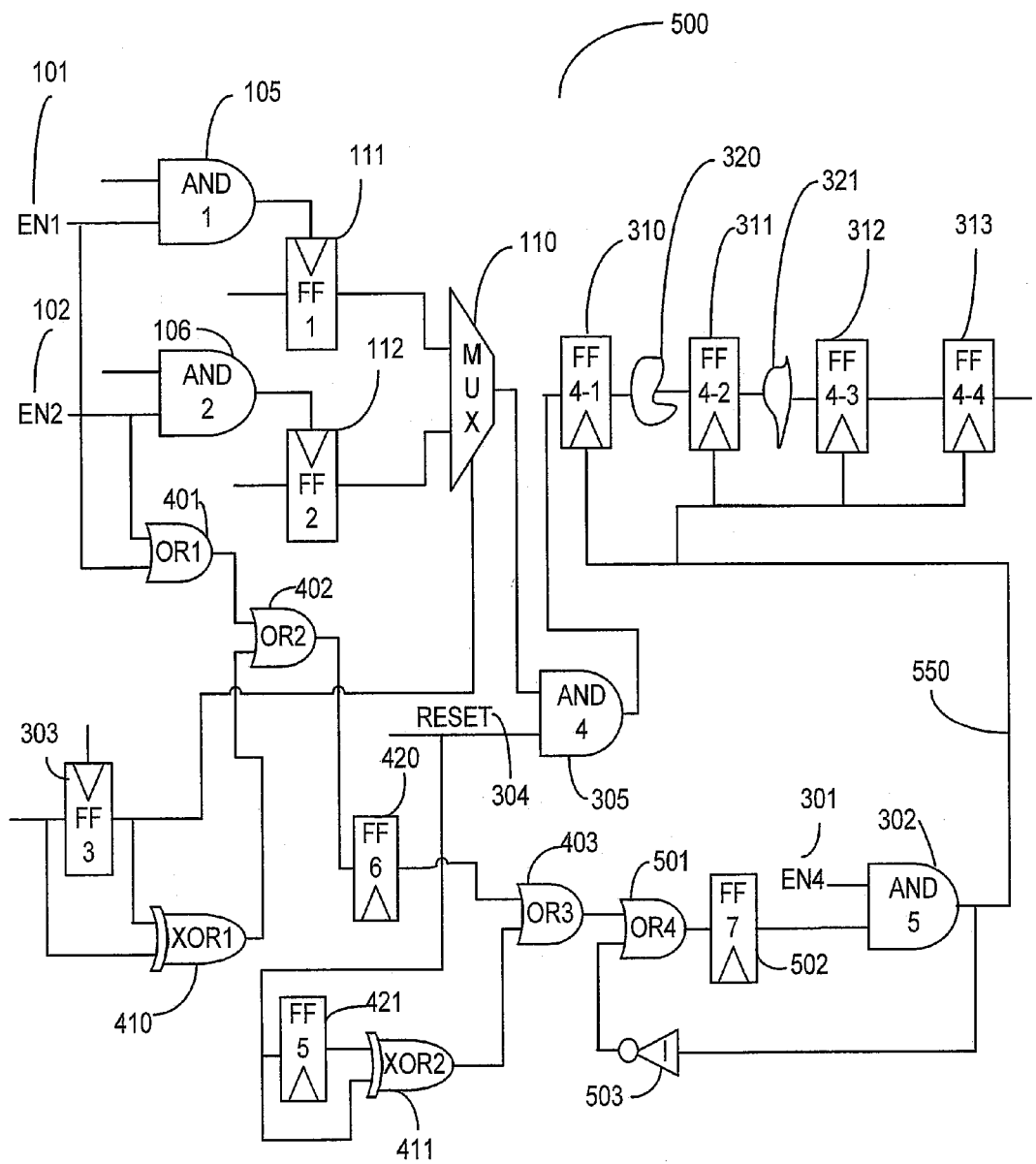
FIG. 5 is modified pipeline logic 500 of FIG. 3 that has been modified to take care of gated flops in the pipeline with an active enable.

This modification is shown in FIG. 5 using the components OR4 501, flop FF7 502, the inverter I 503 with the AND5 302 having an active enable EN4 301. The modified circuit 500 of FIG. 5 is now enabled to produce the signal 'New_STC_FF4-1' that is the signal New_enable_FF4-1 550 for the pipeline stage with all the limitations taken into consideration.

It should be understood that, as shown in FIG. 5, pipeline stages may comprise a series of flops FF4-1 310, FF4-2 311, FF4-3 312 and FF4-4 313. Some flops of the pipeline being interconnected through pure logic circuits as is the case of FF4-1 310 to FF4-2 311 through logic 320 and FF4-2 311 to FF4-3 312 through logic 321. Some other flops being directly connected as in the case of FF4-3 312 to FF4-4 313. The existence of the pure logic between the pipeline stages do not typically impact the operation of the pipeline.

Power savings of any STC gate clocking where the inputs change often, that is if the activity level is high due to input changes or enable changes, will be limited. Hence before establishing a clock gating scheme the activity level of the STC condition has to be evaluated. In order to evaluate if the clock gating is good, the activity level of the STC condition needs to be evaluated. An activity level threshold, for example activity over 50%, negates the power saving effect of clock gating.

Figure 6:
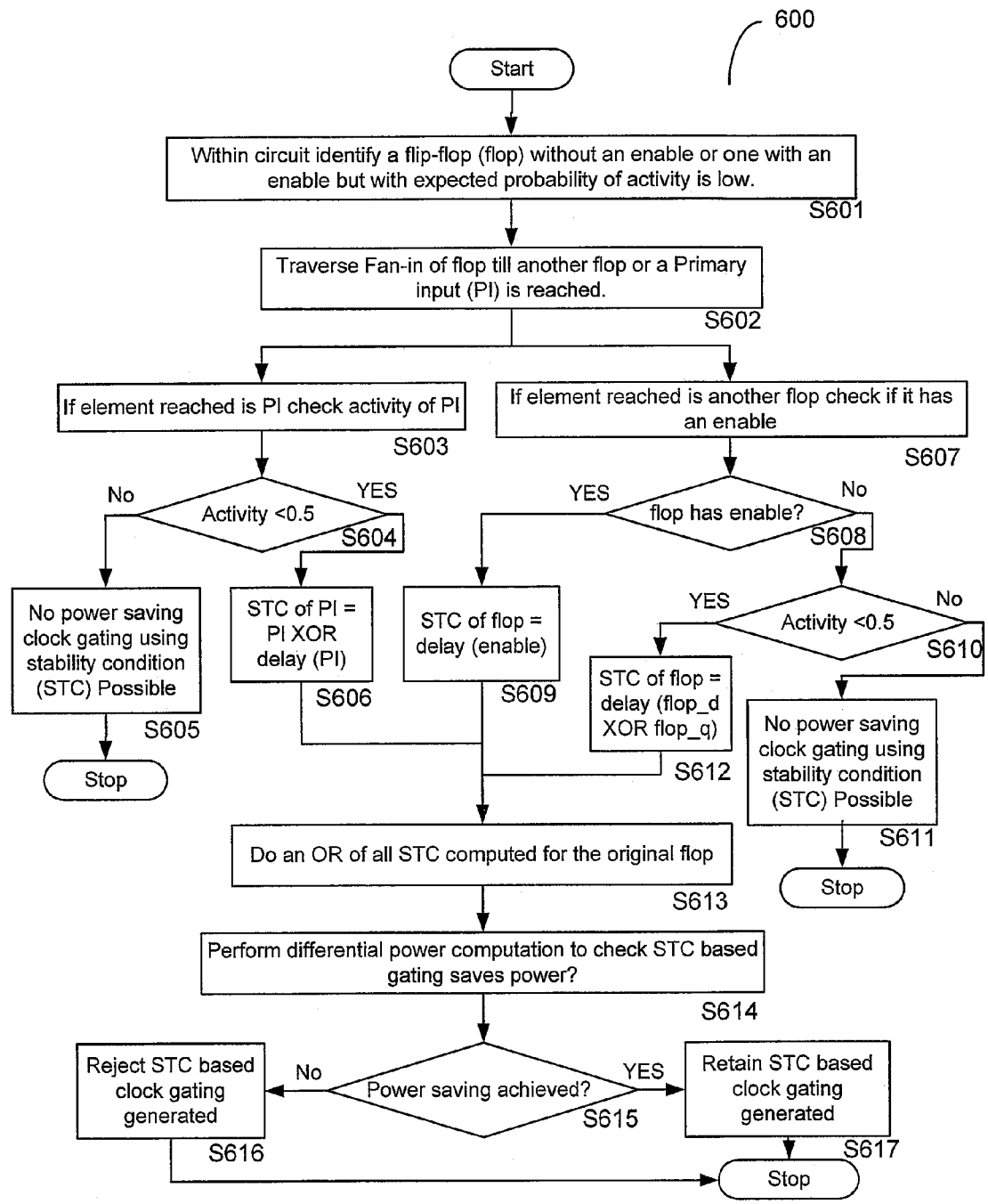
FIG. 6 is a flowchart 600 for synthesizing a clock gating circuit for pipelined designs using STC according to an embodiment.

FIG. 6 is an exemplary and non-limiting flowchart 600 for generating the clock gating for a pipeline circuit, which includes flops with and without enables, PI and enabled pipelined stages. The exemplary method is as follows:

Within the IC choose a flop, say flop 1, with no enable or one with an enable but with an activity probability that is low, typically 25%. This is because of the fact that if the activity levels are high, the clock gating will not provide any major power saving advantage as the associated circuit of the selected flop is used often and the clock gating has to be enabled often with no power saving. In this case any additional clock gating circuits added will tend to increase the power and area usage of the IC. (S601)

Traverse the fan-in circuit of the selected flop 1 till another flop, flop 2, is reached or a PI to the circuit is reached. (S602)

If a PI is reached during traversal of fan-in of flop1, then the activity of the PI is checked to see if it is below a necessary threshold. That is check for PI activity threshold, typically of less than 50%. (S604)

If the activity level of the PI is higher than the 50% threshold level then no power saving is possible using STC based clock gating generated from the PI for flop 1 and hence the STC condition is not generated for the PI and the activity is stopped. (S605)

If the activity level of the PI is lower than the threshold level of 50% then generating an STC condition to gate the clock to the flop 1 is generated by generating the STC of PI. STC of PI=PI XOR (delay PI). (S606)

If during traversal of the fan-in of flop 1 the element reached is a flop, flop 2, then it is checked to see if it has an enable. (S607)

If flop 2 has an enable then an STC condition has to be derived and if it does not have an enable an activity check is done on the flop 2. (S608)

For the flop, flop 2, with an enable, the STC condition is generated for that flop 2 by delaying the enable. STC of flop with enable=delay (enable). (S609)

For the flop, flop 2, without enable the activity of the Flop 2 is checked to see if it is below a necessary threshold. Check for flop 2 activity threshold typically less thin 50%. (S610)

If activity level of flop 2 that has no enable is found to be greater than the threshold level of 50% then no power saving is achieved by using STC based clock gating generated from flop 2 for the original flop 1. The STC condition for flop 2 is not generated and the activity is stopped. (S611)

If the activity level of the flop 2, that has no enable, is found to be less than 50% then an STC condition for the flop is generated by delaying an XORed output of the input of flop 2 with the output of the flop 2. STC of flop_no enable=delay (flop_d XOR flop_q) (S612)

All the generated STC conditions from the PI and other flops, such as flop 2, are combined using OR gates to generate the final STC condition for the flop 1. (S613)

A differential power check is done for the original flop, flop 1, with the clock gating generated using the combined STC condition, to see if there is sufficient improvement in power saving to warrant retaining the generated clock gating. (S614)

The result of the differential power check is evaluated. (S615)

If the power saving is not sufficient then the clock gating using the STC condition generated is not implemented for the flop 1 and the operation is stopped. (S616)

If the power sufficient power saving is achieved, then the clock gating of the original flop, flop 1 is implemented as part of the circuit design thereby completing the generation of an STC condition to provide clock gating for the original flop, flop 1. (S617)

It should be noted that such effort for generating the STC condition and implementation of clock gating is continued for all the flops in the design to achieve power saving.

Figure 7:
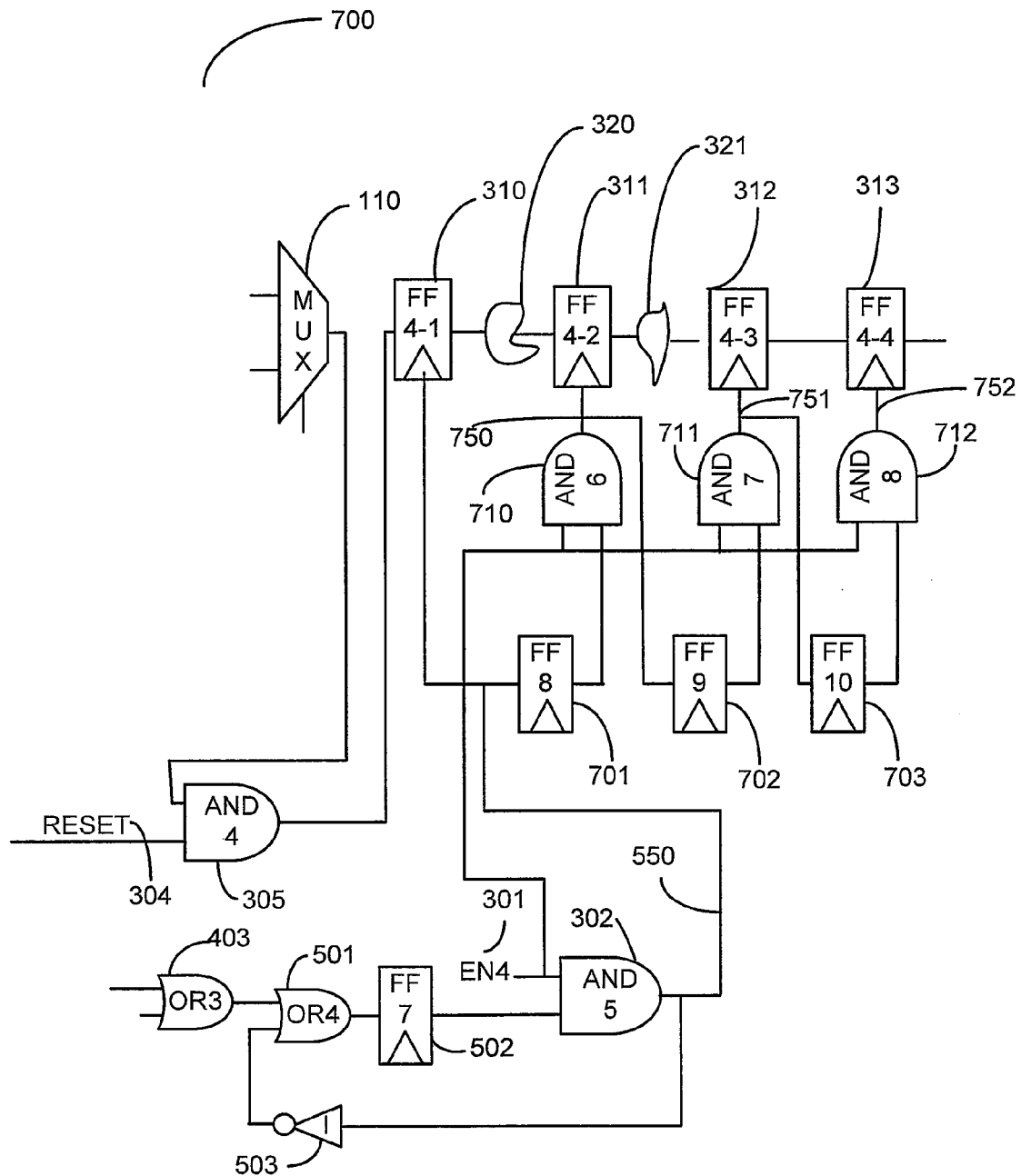
FIG. 7 is a flowchart 700 for implementing a delay in a clock gating circuit for pipeline flip-flops.

Once the STC condition has been generated and circuit modification has been introduced to generate the New-_STC_FF4-1 550, or New-enable_FF4-1 to provide an equivalent clock gating to enable the flop FF4-1 310, further improvements can be made the clock gating to optimize the power dissipation of the circuit of the rest of the pipeline flops FF4-2 311 to FF4-4 313. As is evident from the circuit, each flop of the pipeline operates in a sequential fashion. Hence using the STC condition generated for the first flop FF4-1 310 of the pipeline design 300, for the rest of the flops FF4-2 311 to FF4-4 313 is not optimum. FIG. 7 is an exemplary and non-limiting block diagram 700 for generating clock gating for each of the pipeline flops ff4-2 311 to FF4-4 313 of the pipeline. The generation of the clock gating signal is accomplished by providing each of the pipelined flops with a new enable 750 for flop FF4-2 311, enable 751 for flop FF4-3 312 and enable 752 for flop FF4-4 313, by delaying the STC condition of the previous stage and doing an AND function with the delayed STC condition generated and the enable EN4 302.

The gated clock, enable 750 for FF4-2 311 can be written in Verilog as:
   Reg Delay2;
   Always @ posedge clk
   If (EN4)
   Delay2<=New_enable_FF4-1
   New_enable_FF4-2=Delay2 && EN4;

Similarly the gated clock, enable 751 for FF4-3 can be written in Verilog as:
  Reg Delay3;
  Always @posedge clk
  If (En4)
  Delay3<=New_enable FF4-2;
  New_enable_FF4-3=Delay3 && EN4;
And For FF4-4 313 the enable will be:
  Reg Delay4;
  Always @posedge clk
  If (En4)
  Delay4<=New_enable FF4-3;
  New_enable_FF4-4=Delay4 && EN4;

The implementation of these functions is shown in exemplary and non-limiting FIG. 7. The delay element flop FF8 701, with AND6 710 generates the new enable 750 for FF4-2 311. The delay element flop FF9 702 with AND7 711 generate the new enable 751 for FF4-3 312 and the delay element flop FF10 703 with the AND8 712 generate the new enable 752 for flop FF4-4 313. These new enables for the pipeline flops FF4-2 311, FF4-3 312 and FF4-4 313 generated can provide the additional power dissipation improvements by clock gating of the pipeline flops. The effectiveness of these additional gating circuits of FIG. 7 have also to be verified by differential power analysis to make sure that they provide reasonable power saving to warrant the additional circuits.

A new technique called the XOR technique has been described that enable the computation and synthesis of the STC condition for any flop in an IC design taking into account all the different logic conditions in the fan-in of that flop. This generated STC condition is used to modify the enable of the specific flop and other flops in a pipeline if the flop considered is the first of the pipeline stage without impacting the functionality of the design. The STC condition generated using the XOR technique enable synthesis and verification of clock gating of the flops of a design, for power reduction, while retaining the functionality of the design through all fan-in conditions. The computation and synthesis of the STC condition using the XOR technique lends itself to implementation using a computer system having at least a processor and at least sufficient storage capability for a suitable operating system, the design software and the synthesis software.

The invention may be implemented as part of an integrated circuit design, system on chip design, processor design, FPGA design and other semiconductor designs including a combination of the above. The invention may also be implemented as a synthesis and verification program to generate implement and verify the necessary design modifications of a basic design to achieve power reduction in operation by gate clocking. The invention may be implemented as a software program stored in a non-tangible memory module, the instructions of which to be executed on a processor, a combination of integrated software and hardware or as emulation on hardware, including but not limited to a computer aided design (CAD) system.

What is claimed is:

1. A method implemented in a programmable computing system for clock gating synthesis for an integrated circuit design, the computing system having at least one processing unit and a memory accessible by the processing unit, the memory storing a hardware description of at least a portion of the integrated circuit design, the memory also storing a set of program instructions that when executed by the processing unit causes the computing system to perform steps comprising:

(a) selecting a flip-flop from the hardware description that has been identified as having at least one of an expected probability of activity below a first threshold and the absence of an enable input;
   (b) traversing a fan-in path of the selected flip-flop until one of another flip-flop and a primary input is reached;
   (c1) whenever the fan-in path reaches a primary input with an activity level below a second threshold, then computing, using a computer system, a stability condition for the primary input;
   (c2) whenever the fan-in path reaches another flip-flop with either an enable input or an activity level below a third threshold, then computing, using the computer system, a stability condition for that flip-flop;
   (d) repeating fan-in path traversal and stability condition computation for other paths of the selected flip-flop until all fan-in paths have been traversed;
   (e) combining all computed stability conditions for the fan-in path of the selected flip-flop with OR logic;
   (f) performing a differential power computation, using the computer system, of the combined stability conditions for the flip-flop and retaining the combined stability conditions in the design whenever power savings are achieved; and
   (g) repeating steps (a)-(f) for all other identified flip-flops in the integrated circuit design.

2. The method of claim 1, wherein the stability condition for the primary input is computed in step (c1) as a logical XOR of the primary input with a one clock cycle delay of the same primary input.

3. The method of claim 1, wherein the stability condition for a flip-flop having an enable input is computed in step (c2) as a one clock cycle delay of that enable input.

4. The method of claim 1, wherein the stability condition for a flip-flop without an enable input and an activity level less than the third threshold is computed in step (c2) as a one clock cycle delay of a logical XOR of the flip-flop data input and data output.

5. The method of claim 1, wherein the selected flip-flop has an active enable and the stability condition is computed as a logical AND of the active enable and a one clock cycle delay of a new stability condition that is a logical OR of the combined stability conditions from step (e) and an inversion of the logical AND output.

6. The method of claim 1, wherein the selected flip-flop is a first flip-flop of a pipeline with an active enable, each subsequent flip-flop in the pipeline having a stability condition computed as a logical AND of the active enable of the first flip-flop in the pipeline and a one clock cycle delay of the stability condition of the preceding flip-flop in the pipeline.

* * * * *